April 8, 1941.   J. H. RAND, JR   2,237,869
ELECTRIC RAZOR
Filed March 14, 1939
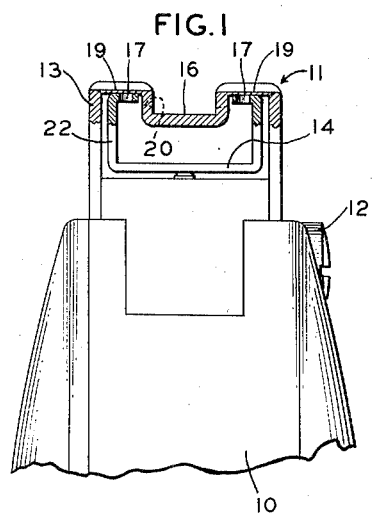
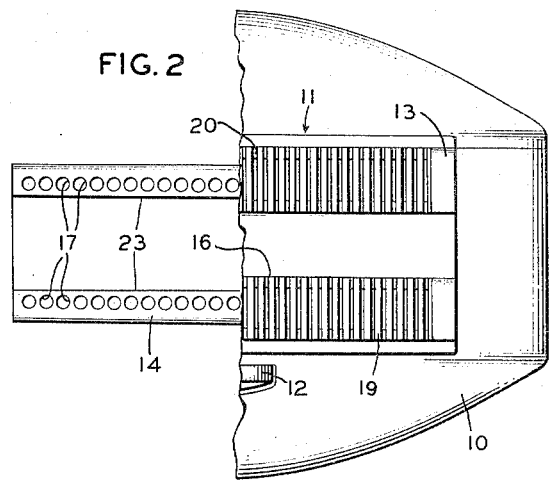
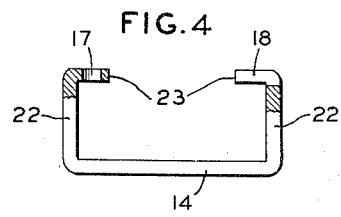
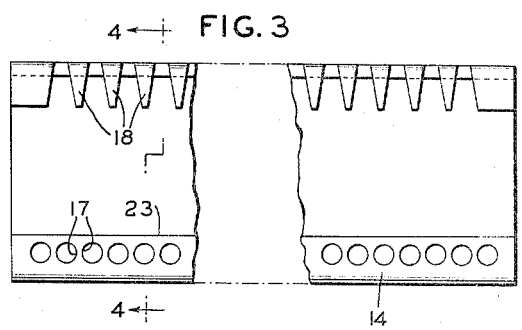
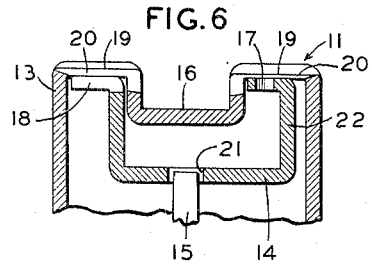
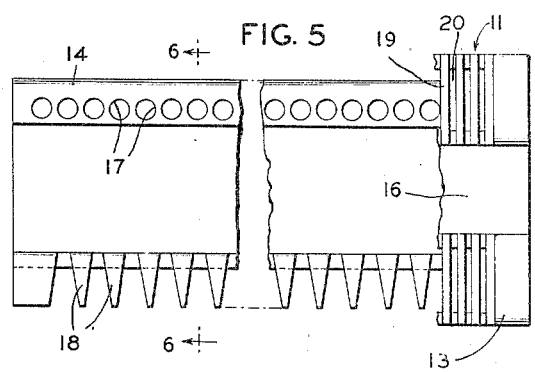
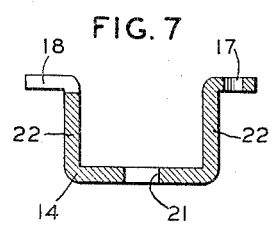
INVENTOR
J. H. RAND, JR.
BY W. A. Spark
ATTORNEY Patented Apr. 8, 1941

2,237,869

UNITED STATES PATENT OFFICE 2,237,869

ELECTRIC RAZOR

James H. Rand, Jr., Stamford, Conn., assignor to Remington Rand Inc., Buffalo, N. Y., a corporation of Delaware Application March 14, 1939, Serial No. 261,722

5 Claims. (Cl. 30—43)

This invention relates to improvements in the shearing head for electric razors, and more particularly features varied degrees of thickness in the outer shear plate, and also a novel combination of cutting elements on the inner cutting member. In form and shape it is substantially like the device covered by R. E. Benner in his application for patent filed December 7, 1937, bearing Serial No. 178,464, but differs from it in the features of construction above mentioned.

One of the principal objects of this invention is to provide a shearing head having an outer shear plate formed with a plurality of cutter bars, and an inner cutter formed with a plurality of openings and combing edges. An outstanding advantage of this construction is that the cutter bars of the outer shear plate and the combing edges of the inner cutter guide hairs into the openings of the inner cutter for a close shearing.

Another object of this invention is to provide a shearing head having an outer shear plate of varying thicknesses, to engage an inner cutter having varying cutting elements, the thicker portions of the shear plate engaging that part of the inner cutter having cutter bars, while the thinner portions thereof engage perforated parts of the inner cutter. In the former instance, the object is to afford means thereby to cut long hairs; in the latter, to cut short hairs.

A more clear conception of the operation, construction, and further objects of my invention may be had from the following specification when read in conjunction with the accompanying drawing, in which Fig. 1 is an end elevation of an embodiment of this invention with parts broken away;

Fig. 2 is a top plan view with parts broken away to disclose both inner and outer cutters;

Fig. 3 is a top plan view of a modified form of the inner cutter covered by this invention;

Fig. 4 is a cross section of an inner cutter embodied in this invention, taken substantially along line 4—4 of Fig. 3;

Fig. 5 is a top plan view of the shearing head with parts of the outer cutter broken away showing another modified form of the inner cutter;

Fig. 6 is a cross section of the shearing head taken substantially along line 6—6 of Fig. 5;

Fig. 7 is a cross section of another modified form of an inner cutter.

Like characters of reference refer to like parts in the drawing.

Referring to the drawing more particularly, a motor casing 10 is shown, in which is enclosed a well known motor for an electric razor. A shearing head 11 is secured to casing 10 by a set screw 12. Shearing head 11 comprises an outer cutter 13 and an inner cutter 14. Inner cutter 14 is reciprocally mounted within outer cutter 13, and is reciprocated therein by actuating rock lever 15 (Fig. 6).

Shearing head 11 is substantially in the form and shape of that disclosed in R. E. Benner's application for patent hereinbefore referred to. The present structure differs in that outer cutter 13 has a longitudinal channel 16 whose width is not greater than one third the width of the entire top portion thereof. Experiments have proved this to be the most satisfactory width of channel 16, affording adequate means for stretching the skin to effect a close shave without any discomfort from chafing. In addition to the foregoing, the present structure contains perforations 17 on inner cutter 14, as well as the combination of pointed teeth 18 and perforations 17.

Figs. 1 and 2 show an outer cutter 13, formed with slots 20 and having cutting bars 19 of uniform and exceptional thinness. This is only possible in a device of this type and character, wherein the inner cutter 14 has cutting elements formed by perforations 17.

Figs. 3 to 7 inclusive, show other forms of inner cutters 14. In each of these, the bottom portion thereof consists of a flat plate formed with a hole 21 which engages the lever 15 by which it is reciprocated. Integrally formed with the bottom plate 14 are side walls 22 which support the shearing edges 17 and 18. In Figs. 1 and 2, the shearing edges are formed by holes 17 cut into the inwardly bent over portion of the side wall. In Figs. 3 and 4, a modification is shown wherein one side of the inner cutter is formed with teeth 18 instead of holes. Figs. 5 and 6 show a cutter in which the teeth 18 are formed by bending the side plate 22 away from the central portion, and in Fig. 7 a cutter is shown in which both shearing faces are formed by bending the side walls outwardly from the central portion.

The operation of the present invention with the various forms of cutters described above, is similar in every way to other forms of razors which are well known in the art. However, the action of the perforations 17 in the flat bent over portion of the inner cutter is functionally different from the slots or teeth 18. It has been found by experiment that a much thinner slotted top plate 19 may be used with this form of cutter without sacrificing mechanical strength. As the cutter 14 is reciprocated under the plate 19, the open areas 17 are successively moved under the open slots 20 and the cross bars 19, such movements causing a shearing action between the sides of the slots 19 and the holes 17. The relative shapes of these openings is such that the shearing edges are always protected from damaging each other, while at the same time effecting a positive cutting action.

While I have described what I consider to be a highly desirable embodiment of my invention, it is obvious that many changes in form could be made without departing from the spirit of my invention, and I, therefore, do not limit myself to the exact form herein shown and described, nor to anything less than the whole of my invention as hereinbefore set forth, and as hereinafter claimed.

What I claim as new, and desire to secure by Letters Patent is:

1. A shearing head having a slotted outer shear plate of varying thickness equally intersected on its upper surface by a longitudinal channel, and a U-shaped inner cutter reciprocally mounted within said outer shear plate, said inner cutter having a plurality of perforations and teeth on respective bent over portions of each arm thereof and combing edges formed by the teeth of one of said portions.

2. A shearing head having a slotted outer shear plate equally intersected on its upper surface by a longitudinal channel, one portion of said upper surface being thinner than the other and a U-shaped inner cutter reciprocally mounted within said outer shear plate, said inner cutter having a plurality of perforations and teeth on respective bent over portions of each arm thereof and combing edges formed by the teeth of one of said portions, the perforated portion thereof underlying the thinner portion of said outer shear plate.

3. A shearing head having a sloted outer shear plate equally intersected on its upper surface by a longitudinal channel, one portion of said upper surface being thinner than the other and a U-shaped inner cutter reciprocally mounted within said outer shear plate, said inner cutter having a plurality of perforations and teeth on respective bent over portions of each arm thereof and combing edges formed by the teeth of one of said portions, the perforated portion thereof underlying the thinner portion of said outer shear plate.

4. A dry shaving head having an outer shear plate of varying thickness equally intersected on its upper surface, each intersected surface being slotted to form a plurality of cutter bars, and a U-shaped inner cutter having arms bent over in the same direction underlying the slots and cutter bars of the outer shear plate, one of said bent over portions being perforated and the other being cut to form a plurality of teeth, said perforated portion underlying the thinner part of said outer shear plate.

5. A shearing head having an outer shear plate of varying thickness equally intersected on its upper surface, each intersected surface being slotted to form a plurality of cutter bars, and a U-shaped inner cutter having arms bent over in opposite directions underlying the slots and cutter bars of the outer shear plate, one of said bent over portions being perforated and the other being cut to form a plurality of teeth, said perforated portion underlying the thinner part of said outer shear plate.

JAMES H. RAND, Jr.